Patented May 4, 1943

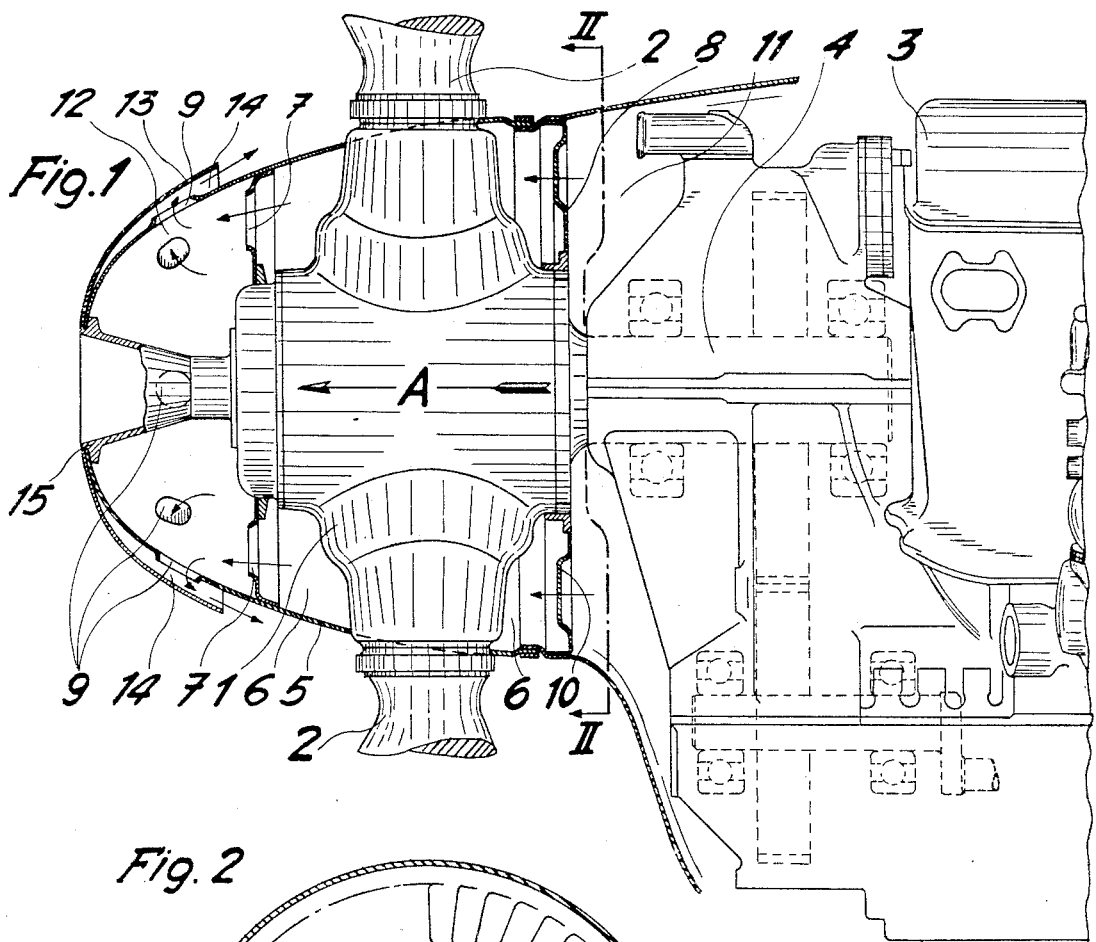
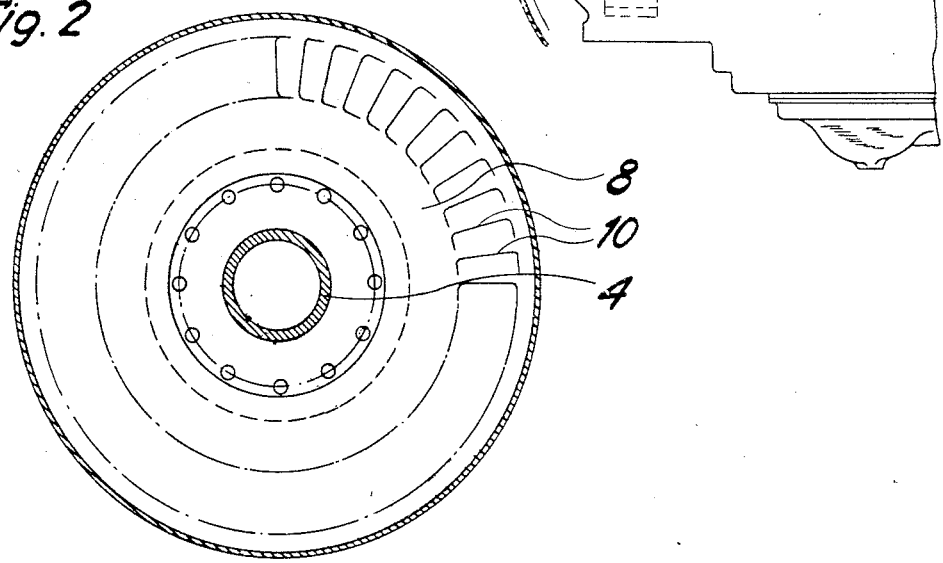

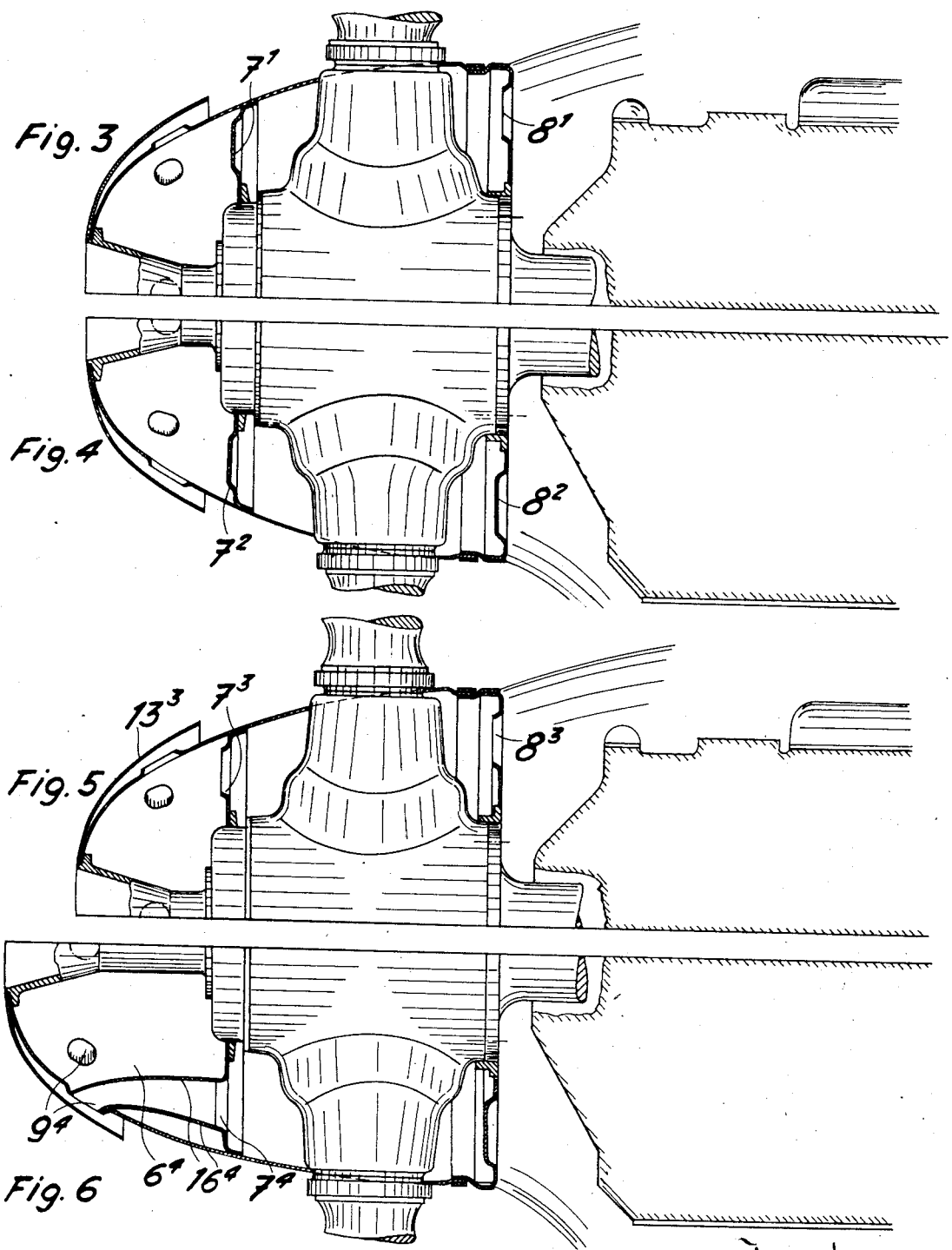

2,318,233

UNITED STATES PATENT OFFICE 2,318,233

AIRCRAFT PROPELLER

Curt Keller, Zurich, Switzerland, assignor to Escher Wyss Maschinenfabriken Aktiengesellschaft, Zurich, Switzerland, a corporation of Switzerland Application February 5, 1941, Serial No. 377,550
In Switzerland February 17, 1940

6 Claims. (Cl. 170—160)

This invention relates to a hood for enclosing the hub of variable pitch propellers for use on aircraft. With propellers of this type it may occur that the pitch adjusting mechanism no longer operates properly at high altitudes owing to difficulties of various kinds resulting from the low temperatures prevailing at such altitudes. Thus, for example, the lubricant may congeal, or the oil under pressure serving for the actuation of the pitch adjusting mechanism may become too viscid.

The object of the invention is to provide simple and effective means which automatically prevent the hub from being cooled excessively when flying at high altitude, so that the difficulties referred to above are largely overcome. For this purpose the hood is provided according to this invention with means adapted to produce during flight a difference in pressure between the air surrounding the motor driving the propeller and the air inside the hollow space between hub and hood connected through holes to the atmosphere, in such a sense that heated air is forced from the space surrounding the driving motor through said hollow space in the direction of flight. In order to provide means of the kind referred to, for example, at least one of disc-shaped, slotted supports connecting the hood to the hub and arranged perpendicularly to the axis of the propeller may be designed as an auxiliary fan. Alternatively, an auxiliary hood may be fixed to the front end of the hood proper, this auxiliary hood extending beyond holes provided in the main hood and forming together with the latter an intermediate space so that during flight an ejector-like action is produced near said holes which causes the heated air to be sucked through the space between hub and main hood. In cases where it is desired to force as much heated air as possible from the space surrounding the driving motor around and past the hub, both an auxiliary fan of the kind referred to and also an auxiliary hood on the main hood may be adopted.

The accompanying drawings disclose by way of example several constructional embodiments of the subject matter of the invention. In these drawings:

Fig. 1 shows part of a propeller for use on aircraft and of its driving motor as well as a longitudinal section through a hood surrounding the hub of this propeller.

Fig. 2 is a section on the line II—II of Fig. 1.

Figs. 3 to 6 show different modifications of details.

Referring to Figs. 1 and 2 of the drawings, the numeral 1 denotes the hub of a multi-blade propeller and the numeral 2 indicates the blades of this propeller. The hub 1 encloses a mechanism not shown which automatically varies the pitch of the propeller blades in dependency on the number of revolutions of the motor 3 driving the propeller 1, 2 through shaft 4. Numeral 5 indicates a hood surrounding the hub 1 of the propeller whereby a hollow space 6 is formed. The hood 5 is connected to the hub 1 by disc-shaped, slotted supports 7 and 8 of sheet metal and arranged perpendicularly to the axis of the propeller. Near its front end the hood 5 has holes 9 connecting the hollow space 6 between hub 1 and hood 5 to the atmosphere. The rear supporting disc 8 is designed as an auxiliary fan being provided with a number of propelling vanes 10 (Fig. 2) bent out of the plane of the disc after corresponding cuts have been made. The vanes 10 are arranged in a circular row. Owing to the described shape of the vanes 10 of the auxiliary fan 8 the latter is capable of producing during flight a difference in pressure between the space 11 surrounding the driving motor 3 near the propeller 1, 2 and the front part 12 of the hollow space 6 in such a sense that heated air is forced from the space surrounding the motor 3 substantially in the direction of flight A through the hollow space 6. The numeral 15 denotes a tube for additionally supporting the hood 5 on hub 1.

In the embodiment shown in Figs. 1 and 2 an auxiliary hood 13 is also fixed to the front end of the hood 5. This auxiliary hood 13 extends beyond the holes 9 whereby an intermediate space 14 is formed. During flight an ejector-like action is produced near the holes 9 so that a difference in pressure arises which causes the air heated in the vicinity of the driving motor 3 to be sucked through the intermediate space 6.

In certain circumstances it may be more advantageous to design the supporting disc 7 as an auxiliary fan instead of the supporting disc 8. Such an embodiment is shown in Fig. 3 where $7^1$ denotes the auxiliary fan and $8^1$ a slotted supporting disc.

As shown in Fig. 4, both supports $7^2$ and $8^2$ can be designed as auxiliary fans.

The object aimed at may in certain cases be attained only with the aid of an auxiliary hood $13^3$, as shown in Fig. 5, so that neither of the slotted supports $7^3$ and $8^3$ must be designed as auxiliary fan.

When however, as shown in Figs. 1 and 2, both an auxiliary fan 8 and an auxiliary hood 13 are provided it is possible to force a very large volume of air heated in the neighborhood of the driving motor 3 through the hollow space 6 past the hub 1.

The holes in the main hood which connect the hollow space between the latter and the propeller hub to the atmosphere may be provided at any suitable place. If they are provided at a considerable distance from the front support $7^4$, as shown in Fig. 6 where the numeral $9^4$ indicates such holes, it is advisable to provide guide walls $16^4$ in the intermediate space $6^4$ so that the heated air after having passed through the slotted support $7^4$ is guided towards said openings $9^4$.

What is claimed is:

1. In an aircraft propeller in combination, a hub carrying movably mounted blades, a driving motor operatively connected to said hub, a hood surrounding and rotating with the hub and enclosing together with the latter a hollow space, openings in the hood at points forward of the hub connecting said hollow space to the atmosphere, and means on said hood rotating therewith adapted to produce during flight a difference in pressure between the air surrounding the driving motor and the air inside said hollow space in such a sense that heated air is automatically forced by said means from the space surrounding the driving motor substantially in an axial direction through said hollow space towards said hood openings at points forward of the hub.

2. In a variable pitch propeller in combination, a hub carrying movably mounted blades, a driving motor operatively connected to said hub, a hood surrounding the hub and enclosing together with the latter a hollow space, openings in the hood connecting said hollow space to the atmosphere, slotted supports connecting said hood to the hub, at least one of these supports being designed as a fan adapted to produce during flight a difference in pressure between the air surrounding the driving motor and the air inside said hollow space in such a sense that heated air is automatically forced by said fan from the space surrounding the driving motor through said hollow space in the direction of flight.

3. In a variable pitch propeller in combination, a hub carrying movably mounted blades, a driving motor operatively connected to said hub, a hood surrounding the hub and enclosing together with the latter a hollow space, openings in the hood connecting said hollow space to the atmosphere, slotted supports connecting said hood to the hub, one of said supports having propelling vanes bent out of its plane and adapted to produce upon rotation of the propeller a difference in pressure between the air surrounding the driving motor and the air inside said hollow space in such a sense that heated air is automatically forced by said vanes from the space surrounding the driving motor through said hollow space in the direction of flight.

4. In a variable pitch propeller in combination, a hub carrying movably mounted blades, a driving motor operatively connected to said hub, a hood surrounding the hub and enclosing together with the latter a hollow space, openings in the hood connecting said hollow space to the atmosphere, slotted supports connecting said hood to the hub, and an auxiliary hood fixed to the front end of said first mentioned hood, said auxiliary hood extending beyond said openings and forming with the first mentioned hood a space in which during flight an ejector-like action is produced near the openings so that heated air is automatically sucked from the space surrounding the driving motor through said hollow space in the direction of flight.

5. In a variable propeller in combination, a hub carrying movably mounted blades, a driving motor operatively connected to said hub, a hood surrounding the hub and enclosing together with the latter a hollow space, slotted supports connecting said hood to the hub, at least one of said supports being designed as a fan adapted to produce upon a rotation of the propeller a difference in pressure between the air surrounding the driving motor and the air inside said hollow space, and an auxiliary hood fixed to the front end of said first mentioned hood, said auxiliary hood extending beyond said openings and forming with the first mentioned hood a space in which during flight an ejector-like action is produced near the openings, said fan and said ejector-like action automatically causing during flight heated air to be forced from the space surrounding the driving motor through the hollow space between hub and hood in the direction of flight.

6. The combination of a propeller comprising a hub and blades which are angularly adjustable on said hub and subject to adjustment during flight; a driving motor mounted to the rear of said hub with relation to the direction of flight and operatively connected to the hub to drive the same; a shroud enclosing the hub and spaced therefrom, said shroud being formed to provide a passage encircling the hub through which air may pass in a substantially axial direction in heat exchange relation with the hub, the shroud being provided with atmospheric discharge passages which communicate with the interior of the shroud at a point forward of the hub; and means rendered effective by the rotation of the propeller to draw air into heat exchanging relation with the motor and thence forward through said shroud in heat exchanging relation with the hub, and thence to atmosphere through said discharge passages.

CURT KELLER.